United States Patent
Raghavendra (10) Patent No.: US 10,057,229 B2
(45) Date of Patent: Aug. 21, 2018

(54) SEAMLESS VIRAL ADAPTION

(71) Applicant: Microsoft Technology Licensing, LLC, Redmond, WA (US)

(72) Inventor: Chetan Pentam Raghavendra, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

(21) Appl. No.: 14/731,732

(22) Filed: Jun. 5, 2015

(65) Prior Publication Data

US 2016/0359830 A1 Dec. 8, 2016

(51) Int. Cl.
| | |
|---|---|
| *G06F 17/30* | (2006.01) |
| *G06F 15/16* | (2006.01) |
| *H04L 29/06* | (2006.01) |
| *G06F 21/62* | (2013.01) |
| *G06Q 50/00* | (2012.01) |

(52) U.S. Cl.
CPC ............ *H04L 63/08* (2013.01); *G06F 21/629* (2013.01); *G06Q 50/01* (2013.01); *H04L 63/0414* (2013.01); *H04L 63/102* (2013.01)

(58) Field of Classification Search
CPC ..... H04L 63/08; H04L 63/0414; H04L 63/12; G06F 15/16; G06F 21/629
USPC ..................... 709/4, 204; 726/4, 1
See application file for complete search history.

(56) References Cited

U.S. PATENT DOCUMENTS

| | | |
|---|---|---|
| 8,250,145 B2 | 8/2012 | Zuckerberg et al. |
| 8,875,269 B2 | 10/2014 | Austel et al. |
| 2003/0149781 A1 | 8/2003 | Yared et al. |
| 2007/0101145 A1* | 5/2007 | Sachdeva ............ H04L 63/0815 713/176 |
| 2007/0169165 A1* | 7/2007 | Crull .................. G06F 17/3089 725/135 |
| 2009/0171964 A1 | 7/2009 | Eberstadt et al. |
| 2009/0319387 A1 | 12/2009 | Keithley et al. |
| 2012/0166452 A1 | 6/2012 | Tseng |
| 2012/0210240 A1 | 8/2012 | Neystadt et al. |
| 2013/0282806 A1* | 10/2013 | Steinberg ............... G06Q 50/01 709/204 |

(Continued)

OTHER PUBLICATIONS

International Search Report and Written Opinion for PCT Application No. PCT/US2016/035609 dated Aug. 17, 2016.

(Continued)

*Primary Examiner* — Saleh Najjar
*Assistant Examiner* — Feliciano S Mejia
(74) *Attorney, Agent, or Firm* — Workman Nydegger (57) ABSTRACT

Providing rich contextual information to a user in an authentication agnostic way with respect to the user. A method includes, at an application, receiving a request from a first user to access functionality of the application. The request from the first user comprises information identifying a second user who has consented to their social media information being used by the application. The method further includes sending information to the identity provider which includes information identifying the second user. The identity provider is managed by an entity separate from the application. The method further includes receiving, at the application, social media information common between the first user and the second user. The method further includes providing at least a portion of the common social media information, to the first user, in an authentication agnostic way with respect to the first user's authentication to the application.

20 Claims, 4 Drawing Sheets

(56) References Cited

U.S. PATENT DOCUMENTS

| | | | |
|---|---|---|---|
| 2014/0041038 A1 | 2/2014 | Lessin et al. | |
| 2014/0095618 A1* | 4/2014 | Larson | H04L 67/16 709/204 |
| 2014/0115061 A1 | 4/2014 | Reddy et al. | |
| 2014/0136332 A1 | 5/2014 | Amit et al. | |
| 2014/0328521 A1* | 11/2014 | Colangelo | H04L 67/18 382/118 |

OTHER PUBLICATIONS

"Adding Social Context to Your Content", Retrieved on: Mar. 26, 2015, Available at: https://developers.facebook.com/docs/facebook-login/social-context/v2.3.

"Facebook—App Privacy Settings & Your Info", Retrieved on: Mar. 26, 2015, Available at: https://www.facebook.com/help/262314300536014/.

"Facebook—Data Policy", Retrieved on: Mar. 26, 2015, Available at: https://www.facebook.com/about/privacy/your-info-on-other.

"Facebook—Embedded Posts", Retrieved on: Mar. 26, 2015, Available at: https://developers.facebook.com/docs/plugins/embedded-posts.

"Facebook—Invitable Friends", Retrieved on: Mar. 26, 2015, Available at: https://developers.facebook.com/docsigames/invitable-friends/v2.0.

"International Preliminary Report on Patentability" dated Aug. 29, 2017 issued in PCT Application No. PCT/US2016/035609.

"Second Written Opinion Issued in PCT Application No. PCT/US2016/035609", dated May 26, 2017, 5 Pages.

* cited by examiner

SEAMLESS VIRAL ADAPTION

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems' ability to be interconnected to other computing systems via network connections. Network connections may include, but are not limited, to, connections via wired or wireless Ethernet, cellular connections, or even computer to computer connections through serial, parallel, USB, near-field, communication, or other connections. The connections allow a computing system to access services at other computing systems and to quickly and efficiently receive application data from other computing systems.

Interconnection of computing systems has facilitated so called "social media" and "social networking." Social media allows individuals to create and share data and collaborate on data. As individuals create, share, and collaborate, they typically do so using an authenticated identity authenticated to an identity provider, which is often also a social media provider. Modernly, social media sites have federated to allow users to use a single identity to interact with different sites in a federation. However, typically a user needs to authorize sharing an identity for use with various other sites on a site by site (or application by application) basis. However, users are typically naturally apprehensive about sharing their federated identity with other online websites and/or applications.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for providing rich contextual information to a user in an authentication agnostic way with respect to the user. The method includes, at an application, receiving a request from a first user to access functionality of the application. The request from the first user comprises information identifying a second user. The second user has already consented to allow their social media information (SM Info) from an identity provider to be used by the application. The method further includes sending information to the identity provider which includes information identifying the first user and the second user. The first user and the second user both have social media accounts at the identity provider. The identity provider is managed by an entity separate from the application. The method further includes receiving, at the application, common social media information that is common between the first user and the second user. The method further includes providing at least a portion of the common social media information, at the application to the first user, in an authentication agnostic way with respect to the first user's authentication to the application, but where the first user is authenticated to the identity provider.

This Summary is provided to introduce a selection of concepts in a simplified form that are farther described below in the Detailed Description. This Summary is not intended, to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized, and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments described herein allow a first user which has a social media account with an identity provider, to provide information about a second user, which also has a social media account with the identity provider, to a third party application, which (although federated with) is distinct from the identity provider, without the first user being authenticated to the application. However, the second user has previously consented to having their social media information shared with the application. The application then provides the information about the second user (and potentially the first user) to the identity provider, and receives social media information that is common to both the first user and the second user back from the identity provider. All or part of the social media information can be displayed at the third party application without the first user needing to authenticate to the application. In some embodiments, this can be used to help the first user determine whether or not they would like to authenticate (such as by consenting to using authentication credentials from the identity provider) to the application based on activities of other users.

This can actually serve to increase the efficiency of computing systems on which the application is implemented. In particular, a user interacting with the application will not need to explore as much of the application as was previously done to determine that the user wishes to authenticate, or consent to authentication, to the application. Thus, rather than responding to a user's exploratory interactions with the application, the application has more resources available to efficiently handle other legitimate requests for services from the user or from other users.

Figure 1:
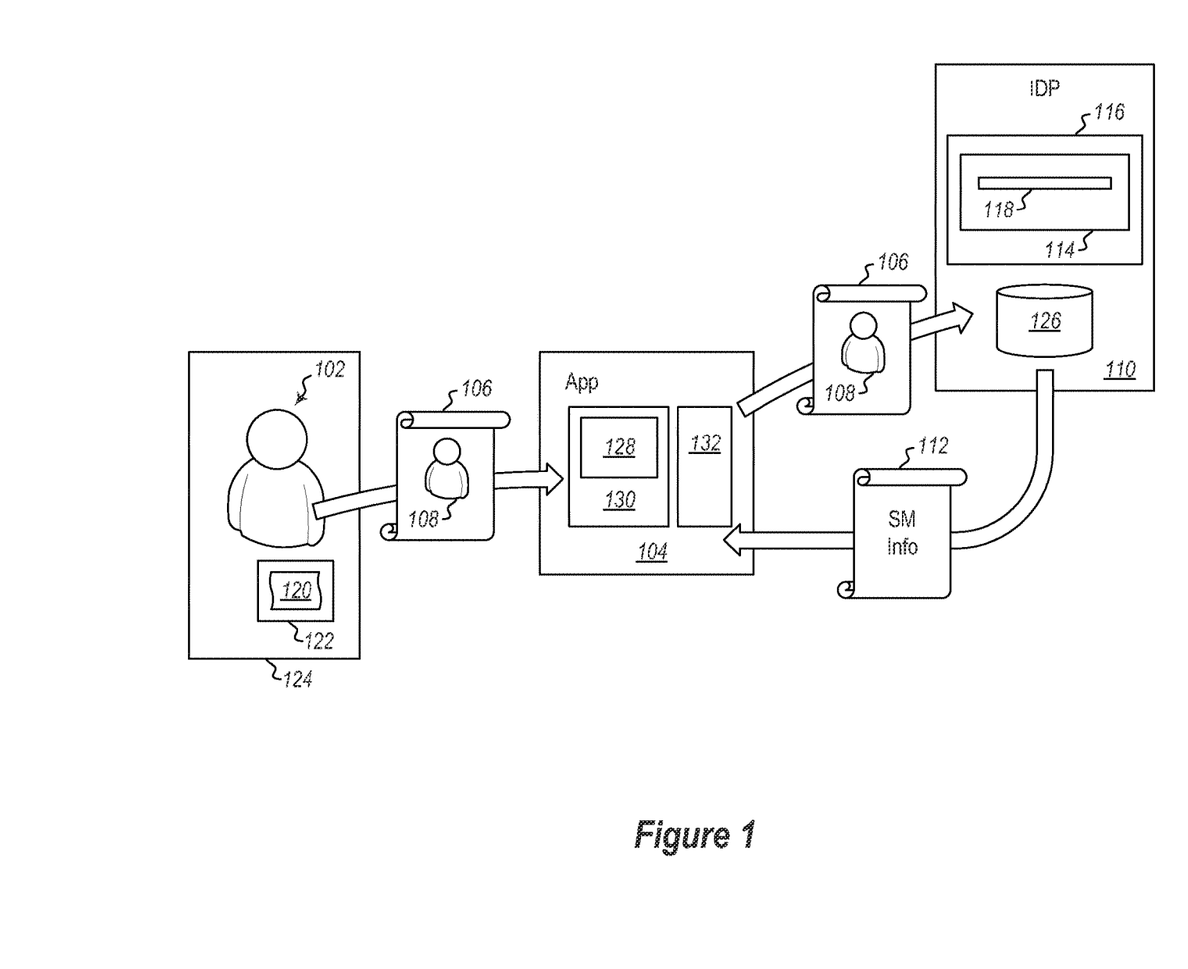
FIG. 1 illustrates an application interacting with an identity provider and sharing social media information from the identity provider to the application.

For example, FIG. 1 illustrates a first user 102 accessing an application 104. The first user 102 provides information 106 to the application 104. The information 106 includes an identification of a second user 108. As will be illustrated below, often this is done as a result of the second user 108 sharing a link to the application 104 or by some other interaction between the first user 102 and the second user 108. The information 106 may also include encrypted information about the first user 102 so that application cannot track the first user 102. However, the identity provider can decrypt the information about the first user 102 to identify the first user 102. Information identifying the second user 108 in the information 106 does not need to be encrypted as application 104 already has permission to use information about the second user 108.

The application 104 sends the information 106, through an interface 132, including the identity of the second user 108 (and typically encrypted information about the first user 102 as well) to an identity provider 110. The identity provider 110 then provides social media information 112 that is common to the first user 102 and the second user 108 to the application 104, which is received by the application through the interface 132. At least a portion of the social media information 112 can then be provided through the application 104 to the first user 102.

Various different pieces of social media information can be provided. For example, in some embodiments, the social media information includes information identifying social media friends that are common between the first user 102 and the second user 108. Alternatively or additionally, the social media information includes information identifying social media interests that are common to the first user 102 and the second user 108. Alternatively or additionally, the social media information includes information identifying social media likes that are common between the first user 102 and the second user 108. Alternatively or additionally, the social media information includes information identifying social media check-in locations that are common between the first user 102 and the second user 108. While various examples are illustrated herein, other social media information may be provided alternatively or additionally. Further, in some embodiments, social media information may be provided for any one of a number of different users that have consented to share their social media information with the application 104.

Additionally, sharing social media information may include combinations of different factors. For example, social media information displayed to the first user 102 at the application may include a list of friends that are common between the first user 102 and the second user 108 where each member in the list of friends that are common have consented to have their social media information shared with the application 104. In another example, the social media information displayed to the first user 102 at the application may include a list of friends that are common between the first user 102 and the second user 108 where each member in the list of friends that are common have liked the same thing. In some embodiments, for a friend's social media information to be displayed in the application 104, they will need to have consented to allow the application to use their social media information.

Common social media information from the identity provider 110 enables the application 104 to provide specific but yet generic activities of the common friends in the application 104 of which the identity provider 110 might not be aware. For example, once a music application knows a set of common friends between the first user 102 and the second user 108, it can show the favorite albums of the common friends to the first user 102. The favorite album information may not be social media information from the identity provider 110, but may be information maintained directly by the application. Thus, in some embodiments, the application can use social media information to identify application specific information. Thus, not only is the application able to show common social media information of the first and second users, the application is able to use the common social media information to show richer information about other users from within the application in addition to the social media information from the identity provider 110.

In some embodiments, while some portions of the common social media information may be provided to the first user in a way that does not require authentication of the first user to the application, a portion of the common social media information may be provided to the first user in a way that does require authentication of the first user to the application 104. Thus, while portions of social media information may be provided in an authentication agnostic way with respect to the first user 102 authenticating to the application 104, other social media information may require the first user 102 to authenticate to the application 104.

As noted, FIG. 1 illustrates the first user 102 providing information 106 to the application 104, including an identification of the second user 108. This may be done in a number of different ways. In one example, the first user 102 may be interacting with an interface 114 (such as a social media website application) provided directly by the identity provider 110. The interface may include a social media feed 116 for the first user 102 (or even for the second user 108) that the first user 102 can interact with. The social media feed 116 may include a link 118 shared by the second user 108 that links to the application 104. For example, the second user 108 may share a link which will appear in a social media feed 116 to the application 104. By the first user 102 selecting the link 118 (such as by clicking on a hyperlink), the first user 102 provides the information 106 to the application 104, which also includes information identifying the second user 108. The link 118 may be configured such that the link also causes encrypted information identifying the first user 102 to be provided to the application 104. The encrypted information may not be readable by the application 104, but can be provided to the identity provider 110 as illustrated above. The identity provider is able to decrypt the information about the first user 102.

An alternative example is now illustrated where a user's own social media information is used in combination with other users' social media information. Consider the following example where a first user 102 comes across a new online site as represented by the application 104. The first user 102 browses around the site and decides to access new functionality of the application 104. At this point, the first user 102 is redirected to a login page (as will be illustrated in FIGS. 2 and 3) for authentication to the application 104. The login page has social media identity provider (such as Facebook Corporation of Menlo Park, Calif., Microsoft Corporation of Redmond, Wash., Google Corporation of Mountain View, Calif., etc.) buttons to sign in with. The buttons may allow a user to consent to having their identity provider credentials used in a federation to authenticate to the application 104 and to allow other social media information to be shared with the application 104. Although the first user 102 is a user of one or more of the identity providers, the first user 102 is hesitant to select any of the buttons because the first user 102 does not yet trust the application 104. Embodiments may include functionality to increase the first user's trust level such that the first user is comfortable selecting an identity sign in button.

For example, the first user 102 may be authenticated at the identity provider 110. The identity provider authentication state 120 may be maintained, in a user agent 122 on a system 124 used by the first user 102. The identity provider 110 is able to provide deep contextual information on the consent page 128 of the application 104 before authentication to the application 104 itself. The consent page 128 is part of a user interface 130 that allows the first user 102 to interact with the application 104. For example, the identity provider 110 looks up the application 104 in its social media data store 126, and all the users who have consented to this application 104. The identity provider 110 also looks up, in its social media data store 126, all of the friends of the first user 102 who is at the consent page 128. A user set comprised, of the intersection of the first user's friends and all users that have consented to the application 104 can be displayed to the user at the consent page 128 to give the user confidence about consenting to using their identity provider provided credentials to authenticate to the application 104.

In some embodiments of the various examples illustrated above, the identity provider 110 could pull up additional attributes from its social media data store 126 to help the first user 102 make a more informed decision about whether or not to consent to using federated credentials for authentication. For example, the identity provider 110 may maintain and provide to the application 104 (and ultimately to the user 102) social media data about how much of the application 104 was used before a given user consented to using federated credentials. Alternatively or additionally, the identity provider 110 may maintain and provide to the application 104 (and ultimately to the user 102) social media data about normalized usage of the application by various users. For example, the identity provider may be able to provide information indicating that the application 104 is used by a given user daily, weekly, or rarely. Alternatively or additionally, the identity provider 110 may maintain and provide to the application 104 (and ultimately to the user 102) social media data about how many users later removed consent for using federated credentials. For example, this may potentially indicate that the application has various undesirable characteristics. Alternatively or additionally, the identity provider 110 may maintain and provide to the application 104 (and ultimately to the user 102) social media data about rating information about the application 104 provided by other users. Alternatively or additionally, the identity provider 110 may maintain and provide to the application 104 (and ultimately to the user 102) social media data about whether or not the application was marked as spam by another user. This can be particularly compelling when the social media data provided is social media data from the first user's friends.

Figure 2:
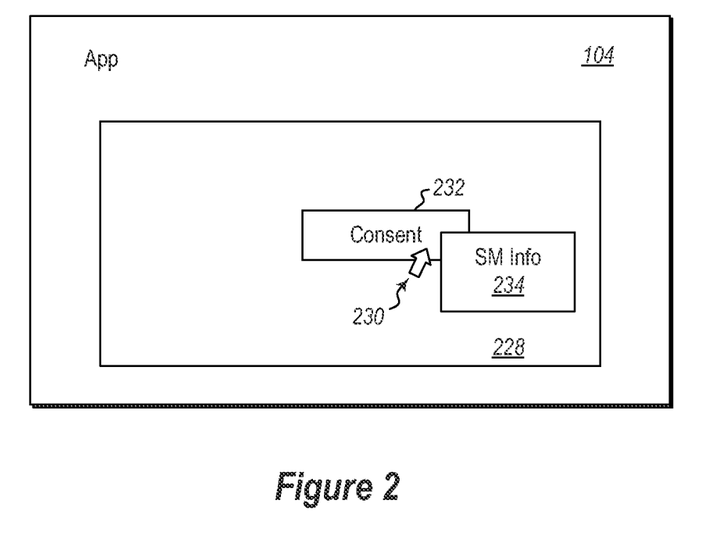
FIG. 2 illustrates a consent page for an application which provides contextual information to a user when seeking consent to use identity provided credentials.

Several different alternatives for a consent page that can be used for the various embodiments above are now illustrated. Referring now to FIG. 2, a consent page 228 that may be implemented at the application 104 is illustrated. In this embodiment the identity provider 110 shows deep contextual information when the first user 102 hovers a pointer 230 over a login button 232 on an application 104. In this example, the first user 102 may be already authenticated at the identity provider 110, but not to the application 104. The login button 232 provides the opportunity for the first user 102 to consent to having credentials from the identity provider 110 be used for logging into the application 104 in a federation of the application and the identity provider 110. The login button 232 may be, for example, an Iframe (i.e. an inline frame which embeds a document into another document) provided by the identity provider 110. The first user 102 hovers the mouse pointer 230 over the identity provider login button 232 embedded in the application 104. On hovering the mouse pointer 230 over the identity provider login button 232, a balloon 234 shows various social media information obtained from the identity provider 110. Examples of such information are illustrated in the examples above. Thus, the first user 102 has access to social media information in close proximity to the login button 232. This can help to increase the first user's confidence with respect to whether or not to consent to using identity provider provided credentials, provided by the identity provider 110 for authenticating to the application 104.

Figure 3:
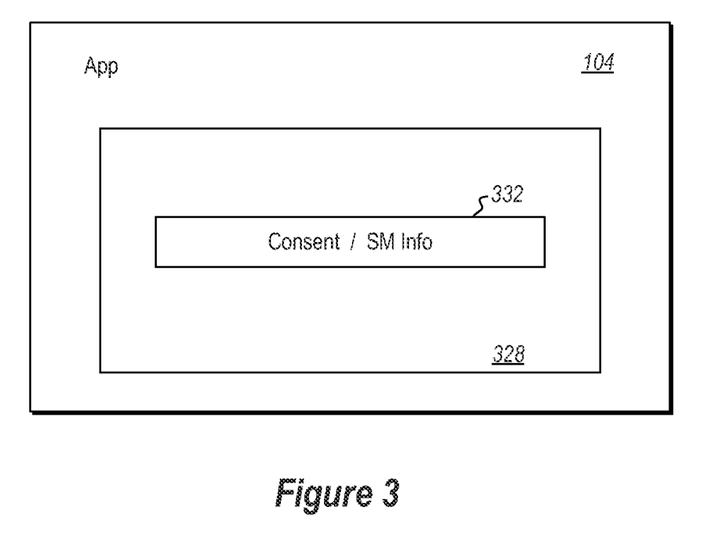
FIG. 3 illustrates another consent page for an application which provides contextual information to a user when seeking consent to use identity provided credentials.

Referring now to FIG. 3, in some embodiments the identity provider 110 can show deep contextual information directly in a login button 332. FIG. 3 illustrates a consent page 328 that may be implemented in the application 104. In this example, the first user 102 is already authenticated at the identity provider 110. The consent page 328 includes a login button 332. In the illustrated example, the login button is embedded in the consent page 328 and may be, for example, an Iframe provided by the identity provider. The login button 332 has sufficient visual real estate to show additional information, including the social media information obtained from the identity provider 110. Alternatively, an Iframe may be provided that includes the button as well as sufficient visual real state to show additional information, including the social media information obtained from the identity provider 110. The social media information may be placed in proximity to the login button, such as above, below, or to the side of the button, but not directly on the login button. Such social media information may be, for example, the information illustrated above.

In another example, the identity provider itself may show deep contextual information in a social media feed. For example, the first user 102 may be viewing a social media feed 116 where a link 118 to the application 104 was shared by the second user 108. Along with the link 118, social media information may be displayed, such as information like that described, in the examples above (such as friends that have consented to use identity provider credentials for the application, how much of the application was used before consent was given, normalized usage by friends of the first user of the application, removal of consent by friends for the application, marking of the application as spam by other users, etc.). The social media information may be displayed persistently with link, when the first user 102 hovers over the link, or in other appropriate ways.

In an alternative embodiment, the application 104 may show contextual information as illustrated above without authentication of the first user 102 to the identity provider 110. This can occur by using a link or other element with contextual information (such as contextual information about the second user 108) that can be provided to the identity provider 110 to obtain social media information about the second user 108.

For example, the second user 108 may share a link 118 on a social media timeline for the second user. The link 118 shows up on the social media feed 116 for the first user 102. The link 118 has context for the second user 108 encoded in the link 118. The first user 102 clicks on the link 118 within an interface 114 provided by the identity provider 110. The identity provider 110 encodes context information about the first user 102 into a call to the application 104. Thus, when the application 104 is activated as a result of the first user 102 selecting the link 118, it has contextual information about both the first user 102 and the second user 108.

The application can then retrieve shared friend information from the identity provider. The identity provider can look up friends' social media information. As illustrated above, in some embodiments, this may be for friends that the first user 102 and the second user 108 have in common. The identity provider 110 can look up social media information for selected or identified friends, and in some embodiments, with particular emphasis on social media information as it relates to the friends' activity at the application 104. The application can then display such social media information on a landing page at the application viewable by the first user 102, the consent page 128 of the application 104, or some other appropriate page of the application 104 which would inspire confidence in the first user 102 to help the first user determine to use credentials for the identity provider 110 in a federated way with the application 104. The first user 102 remains unauthenticated to the application 104 and does not need to maintain authentication information for the identity provider 110 (such as in a cookie or other mechanism as is done in some of the previous examples herein).

Thus, as discussed herein, when an online application wants to acquire new customers virally, a major hindrance for the application is proving the value proposition to the new customer. Any application that wants to show contextual information (such as friends using the application, friends' activities with regard to the application, etc.) requires any new customer to sign up and sign in. The requirement to have a new user sign up/sign in becomes a hindrance to the user where many users choose to close the browser when a site wants the user to sign up to use any functionality unless the user is familiar with the site beforehand. In previous solutions, unless the user is authenticated, there is no context with respect to other users, which the user knows and trusts, using an application.

In the embodiments herein, even before logging in to an application, a prospective user can see other users that the user is familiar with that are using the application, giving more confidence and more encouragement for the user to sign in using federated credentials or consenting to having their identity provider credentials be used for authenticating to an application in a federated way. The increased confidence reduces the barrier in acquiring new customers to an application.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
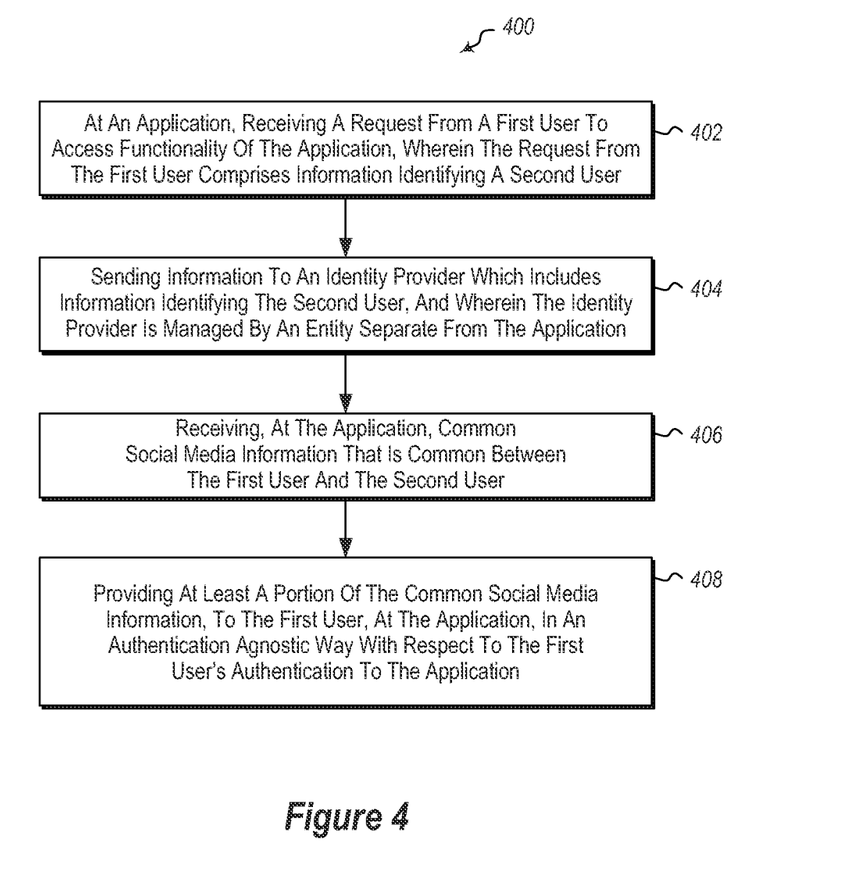
FIG. 4 illustrates a method of providing rich contextual information to a user in an authentication agnostic way with respect to the user.

Referring now to FIG. 4, a method 400 is illustrated. The method may be practiced in a computing environment and includes acts for providing rich contextual information to a user in an authentication agnostic way with respect to the user. The method includes, at an application, receiving a request from a first user to access functionality of the application, wherein the request from the first user comprises information identifying a second user (act 402). For example, as illustrated in FIG. 1, the application 104 receives information 106 from the first user 102, where the information 106 identifies a second user 108. The second user has already consented to allow their social media information from an identity provider by used by the application.

The method 400 further includes sending information to the identity provider which includes information identifying the first user and the second user, and wherein the identity provider is managed by an entity separate from the application (act 404). The first and second users each have social media accounts at an identity provider. For example, FIG. 1 illustrates that the information 106 is sent to the identity provider 110. The identity provider 110, while federated with the application 104, is nonetheless managed by an entity that is separate from the application 104. The identity provider 110 maintains social media information for both the first user 102 and the second user 108.

The method 400 further includes receiving, at the application, common social media information that is common to both the first user and the second user (act 406). For example, as illustrated in FIG. 1, social media information 112 is provided to the application 104.

The method 400 further includes providing at least a portion of the common social media information, to the first user, at the application, in an authentication agnostic way with respect to the first user's authentication to the application (act 408). In particular, the first user 102 is not authenticated to the application 104. However, in the particular example, the first user 102 has a social media account with the identity provider 110.

The method 400 may be practiced where the common social media information comprises information identifying social media friends common to the first and the second user. Thus for example, the social media information 112 may include information about friends that are common to both users.

The method 400 may be practiced where the common social media information comprises information identifying social media friends that are common between the first user and the second user and that have consented to having their social media information used by the application. Thus for example, the social media information 112 may include the list of friends that are common to both the first user 102 and the second user 108 where any friends in the list have also consented to having their social media information shared with the application 104.

The method 400 may be practiced where the common social media information comprises information identifying social media interests that are common between the first user and the second user. Thus for example, the social media information 112 may include information about interests of the second user 108 that are also shared by the first user 102.

The method 400 may be practiced where the social media information comprises information identifying social media likes that are common between the first user and the second user. Thus for example, the social media information 112 may include information about items that the second user 108 has liked that are the same as items that the first user 102 has liked.

The method 400 may be practiced where the social media information comprises information identifying social media check-in locations that are common between the first user and the second user. For example, the second user 108 and the first user 102 may check-in at various locations that the second user 108 and first user 102 visit. To the extent that the users check-in at common locations, the social media information 112 may provide this information to the application 104 where it can be displayed to the first user 102.

The method 400 may further include providing at least a portion of the second user's social media information to the first user, in a way that requires authentication of the first user to the application. In this particular embodiment, some of the social media information 112 can be displayed to the user 102 without the user authenticating to the application 104. However, portions of the social media information 112 may not be available to the first user 102 for viewing until the first user 102 has authenticated (or consented to authentication) to the application 104.

Figure 5:
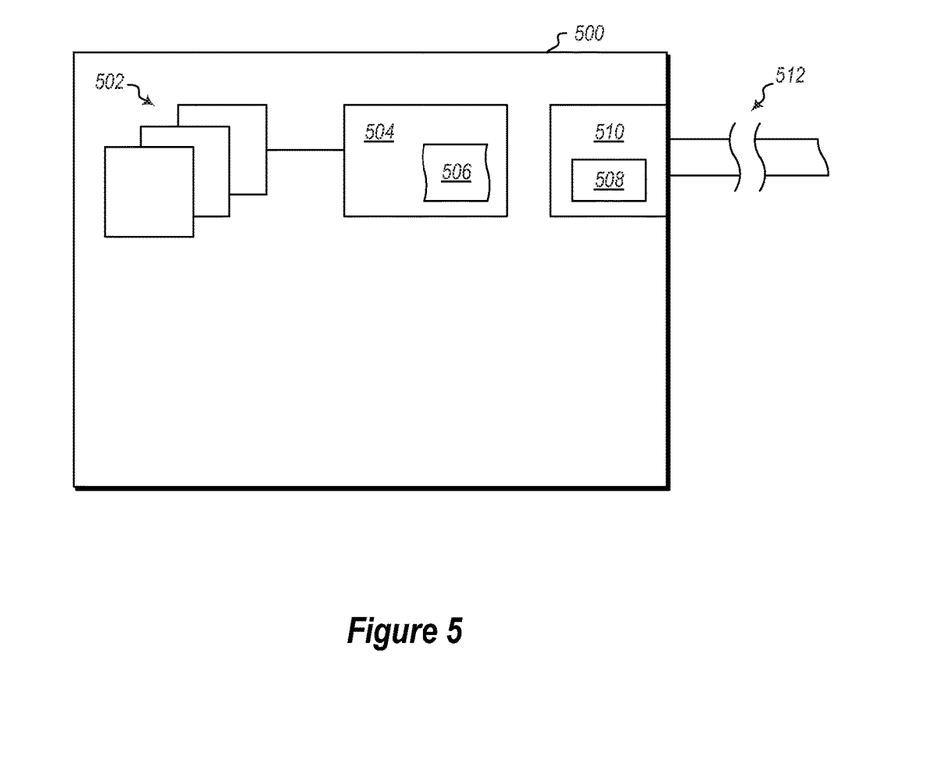
FIG. 5 illustrates a system where embodiments of the invention may be practiced.

With reference to FIG. 5, the methods may be practiced by a computer system 500 including one or more processors 502 and computer-readable media such as computer memory. In particular, the computer memory may store computer-executable instructions that when executed by one or more processors cause various functions to be performed, such as the acts recited in the embodiments.

Embodiments of the present invention may comprise or utilize a special-purpose or general-purpose computer 500 including computer hardware, as discussed in greater detail below. Embodiments within the scope of the present invention may also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media (such as media 504). Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media 504 includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network 512 and/or data links which can be used to carry the desired program code means in the form of computer-executable instructions or data structures and which can be accessed by a general-purpose or special-purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM 508 within a network interface module 510 (e.g., a "NIC"), and then eventually transferred to computer system RAM and/or to less volatile computer-readable physical storage media (such as media 504) at a computer system 500. Thus, computer-readable physical storage media can be included in computer system components that also (or even primarily) utilize transmission media.

Computer-executable instructions 506 comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including but not limited to, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed, system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
   one or more processors; and
   one or more computer-readable media having stored thereon computer-executable instructions that are executable by the one or more processors to implement an application to provide rich contextual information to a user, the computer-executable instructions including instructions that are executable to configure the computer system to perform at least the following:
   prior to any authentication of a first user to the application, perform at least the following:

receiving, at the application, a request from the first user to access functionality of the application, the request from the first user comprising encrypted information associated with the first user and unencrypted information identifying a second user such that the application cannot identify the first user and can identify the second user, wherein the first user and the second user are different users and the second user has already consented to allow social media information associated with the second user to be used by the application, the social media information associated with the second user being stored at an identity provider;

sending the encrypted information associated with the first user and the unencrypted information identifying the second user to the identity provider, the identity provider being configured to decrypt the encrypted information associated with the first user, wherein the identity provider both stores social media information associated with the first user and the second user, and is managed by an entity separate from the application;

receiving, at the application, common social media information that is common between the first user and the second user, the common social media information being based on the social media information associated with the first user and the second user that is stored at the identity provider; and providing at least a portion of the common social media information, to the first user, without the first user being authenticated to the application.

2. The system of claim 1, wherein the social media information comprises information identifying social media friends that are common between the first user and the second user.

3. The system of claim 1, wherein the common social media information comprises information identifying social media friends that are common between the first user and the second user and who have consented to having their social media information used by the application.

4. The system of claim 1, wherein the common social media information comprises information identifying social media interests that are common between the first user and the second user.

5. The system of claim 1, wherein the common social media information comprises information identifying social media likes that are common between the first user and the second user.

6. The system of claim 1, wherein the common social media information comprises information identifying common social media check-in locations between the first user and the second user.

7. The system of claim 1, wherein the user interface is further configured to provide at least a portion of the common social media information, to the first user, in a way that requires authentication of the first user to the application.

8. In a computing environment, a method of providing rich contextual information to a user, the method comprising:

prior to any authentication of a first user to the application, performing at least the following:

receiving, at the application, a request from the first user to access functionality of the application, the request from the first user comprising encrypted information associated with the first user and unencrypted information identifying a second user such that the application cannot identify the first user and can identify the second user, wherein the first user and the second user are different users and the second user has already consented to allow social media information associated with the second user to be used by the application, the social media information associated with the second user being stored at an identity provider;

sending the encrypted information associated with the first user and the unencrypted information identifying the second user to the identity provider, the identity provider being configured to decrypt the encrypted information associated with the first user, wherein the identity provider both stores social media information associated with the first user and the second user, and the is managed by an entity separate from the application;

receiving, at the application, common social media information that is common between the first user and the second user, the common social media information being based on the social media information associated with the first user and the second user that is stored at the identity provider; and providing at least a portion of the common social media information, to the first user; at the application, without the first user being authenticated to the application.

9. The method of claim 8, wherein the common social media information comprises information identifying social media friends which are common between the first and the second user.

10. The method of claim 8, wherein the common social media information comprises information identifying social media friends that are common between the first user and the second user and that have consented to having their social media information used by the application.

11. The method of claim 8, wherein the common social media information comprises information identifying social media interests that are common between the first user and the second user.

12. The method of claim 8, wherein the common social media information comprises information identifying social media likes that are common between the first user and the second user.

13. The method of claim 8, wherein the common social media information comprises information identifying social media check-in locations which are common between the first user and the second user.

14. The method of claim 8, further comprising providing at least a portion of the second user's social media information, to the first user, in a way that requires authentication of the first user to the application.

15. A physical computer-readable storage medium comprising one or more hardware storage devices having stored thereon computer-executable instructions that are executable by one or more processors of a computer system to implement an application to provide rich contextual information to a user, the computer-executable instructions including instructions that are executable to configure the computer system to perform at least the following:

prior to any authentication of a first user to the application, perform at least the following:

receiving, at the application, a request from the first user to access functionality of the application, the request from the first user comprising encrypted information associated with the first user and unencrypted information identifying a second user such that the application cannot identify the first user and can identify the second user, wherein the first user and the second user are different users and the second user has already consented to allow social media information associated with the second user to be used by the application, the social media information associated with the second user being stored at an identity provider;

sending the encrypted information associated with the first user and the unencrypted information identifying the second user to the identity provider, the identity provider being configured to decrypt the encrypted information associated with the first user, wherein the identity provider both stores social media information associated with the first user and the second user, and the is managed by an entity separate from the application;

receiving, at the application, common social media information that is common between the first user and the second user, the common social media information being based on the social media information associated with the first user and the second user that is stored at the identity provider; and providing at least a portion of the common social media information, to the first user, at the application, without the first user being authenticated to the application.

16. The physical computer-readable storage medium of claim 15, wherein the common social media information comprises information identifying social media friends that are common between the first user and the second user.

17. The physical computer-readable storage medium of claim 15, wherein the common social media information comprises information identifying social media friends which are common between the first user and the second user and that have consented to having their social media information used by the application.

18. The physical computer-readable storage medium of claim 15, wherein the common social media information comprises information identifying social media interests that are common between the first user and the second user.

19. The physical computer-readable storage medium of claim 15, wherein the common social media information comprises information identifying social media likes that are common between the first user and the second user.

20. The physical computer-readable storage medium of claim 15, wherein the common social media information comprises information identifying common social media check-in locations between the first user and the second user.

* * * * *